United States Patent [19]

Hartman

[11] 4,032,483

[45] June 28, 1977

[54] MANUFACTURE OF POLYURETHANES FROM BARK

[75] Inventor: Seymour Hartman, Mahopac, N.Y.

[73] Assignee: Champion International Corporation, Stamford, Conn.

[22] Filed: Apr. 20, 1976

[21] Appl. No.: 678,471

[52] U.S. Cl. .................... 260/2.5 AM; 106/122; 260/2.5 A; 260/2.5 AK; 260/2.5 AS; 260/9
[51] Int. Cl.² ............... C08G 18/14; C08G 18/00; C08H 5/04; C08L 99/00
[58] Field of Search ..... 260/2.5 AK, 2.5 A, 2.5 AS, 260/2.5 AM, 9; 106/122

[56] References Cited

UNITED STATES PATENTS

| | | | |
|---|---|---|---|
| 1,455,762 | 5/1923 | Howard | 260/9 |
| 3,256,218 | 6/1966 | Knox | 260/2.5 AK |
| 3,406,127 | 10/1958 | Alexander | 260/2.5 AK |
| 3,549,472 | 12/1970 | King et al. | 260/2.5 AK |
| 3,654,194 | 4/1972 | Christian et al. | 260/2.5 AP |

Primary Examiner—H.S. Cockeram
Attorney, Agent, or Firm—Evelyn M. Sommer

[57] ABSTRACT

Polyurethane compositions formed by the reaction of polyisocyanate with bark and/or bark components such as tannins, as the source of polyol. Mixtures of bark material with conventional polyols, with the bark material comprising at least 30% by weight, may also be used. Polyurethane foams prepared by this process possess a high degree of thermal stability and are fire-retardant.

10 Claims, No Drawings

MANUFACTURE OF POLYURETHANES FROM BARK

BACKGROUND OF THE INVENTION

Polyurethane compositions and their preparation have been investigated intensively thoughout the last few decades. These polymer products have proven extremely versatile and are utilized throughout industry. In particular, urethanes which have been applied as soft or hard elastomer coatings or as adhesives and which are either rigid or flexible and in compact or foamed form have found exceptional commercial utility.

Polyurethanes are polymers characterized by repeating carbamic ester groups. They are produced by reaction of polyisocyanate with polyol. This reaction proceeds readily under a variety of conditions, now well-known in the art.

These conditions, as well as many modifiers of the reaction (such as catalysts, surfactants, blowing agents and the like) are described in detail in *Polyurethanes: Chemistry and Technology*, Vol. XVI, parts I and II of *The High Polymers* series of Saunders and Frisch, Interscience Publishers (1962 and 1964). These books are incorporated herein by reference as if they were set forth at length.

DESCRIPTION OF THE INVENTION

This invention relates to the discovery that useful polyurethane compositions may be produced through utilization of bark and/or its components as the polyol in the reaction with polyisocyanate. More particularly, it has been discovered that bark and/or its components possess sufficient active hydrogen in available form to react with polyisocyanate to produce rigid polyurethane compositions.

One of the few uses for the millions of tons of bark which are produced each year in the lumber and paper industries, is as a combustible. Even for this purpose, however, there are many drawbacks. Bark is not a particularly efficient fuel and often gives rise to severe pollution problems. This invention therefore provides a new use for the substantial and extremely inexpensive amounts of this material which may otherwise require disposal.

Bark is ordinarily provided in comminuted form. This form provides an increased surface area which facilitates higher degrees of reaction. These comminuted particles of bark should preferably have a mesh size of from 50 to 325, most preferably from 100 to 300.

In place of the bark, polyol derivatives thereof, for instance tannin or other compositions containing polyols can be used.

The tannins which can be employed in this invention are the astringent, aromatic glucosides common to plants and trees. As is known in the art, tannins commonly include a broad mixture of individual compounds including the gallotannins; galloyl sugars; ellagitannins or diphenylmethyloids; and catecholtannins or phlobatannins. In the context of this invention, however, the particular compound or mixture of compounds present or predominant is of no regard. It is necessary only that one or more members of the class generally recognized as being tannins is present.

The physical form of the tannins at the time of reaction with polyisocyanate is also important in this invention. Tannins may be present either in their normal acidic state or as basic salts and in solid form. Because of its readily availability, however, it is convenient to utilize a material such as commercial wattel tannin.

In the preferred embodiment of this invention, the polyol component for reaction with the isocyanate is bark, most preferably a soft wood bark, and more preferably, pine bark.

Polyisocyanates useful for formation of polyurethanes with the bark include both the polyisocyanate and other diisocyanates known in the art. These polyurethane precursors encompass a large number of individual compounds, most preferred of which are toluene diisocyanate and p-p' diphenylmethane diisocyanate and polymeric diisocyanate (crude MDI).

The stoichiometry of reaction of these polyisocyanates with bark materials varies, dependent largely upon the hydroxyl number of the bark. Optimum stoichiometry may readily be determined as is known in the art however, through correlation of the reactivities of the specific bark or bark components and specific diisocyanate precursor employed. Thus, by analysis of the percent hydroxyl values of the bark and bark components (tannin), the hydroxyl number can readily be calculated and therefrom, optimum proportions of reagents are readily determined.

The results and advantages of this invention do not require exclusive use of bark and or bark components i.e. tannin or tannin materials as the source of polyol for production of polyurethanes. Mixtures of bark material with conventional polyols, such as the glycols and glycerols, can be utilized in combination. In this manner, the known advantages in product properties resultant from these other polyols may also be incorporated into the polyurethanes of this invention. In these circumstances, optimum stoichiometry is again readily determined, as indicated above, based on the hydroxyl number of polyols. Preferably, however, bark and/or bark components should comprise at least 30%, most preferably from 50 to 100% by weight of the total polyol reagent employed.

In addition to the formation of dense polyurethanes, lighter foam products may also be produced. Foaming, which permits production of polyurethane compositions having densities ranging from about 1 to 40 pounds per cubic foot, may be induced by incorporating conventional blowing agents such as Freon or water within the initial reaction mixture.

Other conventional additives, such as catalysts, surfactants and the like, are also useful for modification of the present polyurethane foam compositions. These additives function in the same manner and by the same means for which they are well-known in the prior art.

In addition to substantially reducing product cost by using an inexpensive or waste bark and/or bark component material in production of polyurethane and polyurethane foams, the present invention has solved one of the major physical drawbacks of the prior art. Known polyurethane compositions are highly flammable and thus have engendered substantial research into methods for overcoming this property. This research has generally involved either the incorporation of flame-retardant materials into the polyurethane or direct alteration of the polymer itself.

Evaluation of these (bark-polyisocyanate) polyurethane foams, it was found that they possess a high degree of thermal stability as well as being fire-retardant (self extinguishing). This inherent flame retardancy of polyurethane foams in general is almost entirely a function of the chemical composition of the solid polymer and the flammability of polyurethane foams can be reduced by using:
a. components with a high degree of aromaticity
b. High molecular weight polyols
c. polyols with a high functionality — at least 4
d. aromatic isocyanates with a functionality of 2.3 to 3.2
e. cyclic rather than open chain polyols Bark — which contain the following principle components lignin, cellulose, tannins and related water insoluble phlobaphenes, other organic components — saponins, mannitol, dulcitol, etc., contain within these components many of the above listed inherent fire-retardant characteristics, i.e., high degree of aromaticity (lignin, tannin, cellulose, etc.), high molecular weight component with high functionality, cyclic rather than open chain polyols. Furthermore, the polyisocyanates (crude MDI) used possess high degree of aromaticity as well as high functionality.

Thus, the fire-retardant properties obtained are mainly derived from the design of the components used.

The following examples are further illustrative of this invention.

EXAMPLE I

Pine bark (100 mesh) 40 grams was blended with polyisocyanate MDI (crude) 100 grams and allowed to remain overnight. The material thusly obtained became very hard and was possessed of large cell size.

EXAMPLE II

|  | Parts |
|---|---|
| Pine Bark | 75 |
| MDI (crude) | 100 |
| H$_2$O | 10 |
| Surfactant L-5420* | .5 |

*Union Carbide silicone

An exotherm developed on blending of the aforesaid components and the resultant material was foamed. Water was employed as the blowing agent.

EXAMPLE III

A rigid polyurethane foam was produced from the following ingredients:

| Ingredient | Parts |
|---|---|
| Pine Bark | 50 |
| Percent Hydroxyl - 12.5% | |
| Hydroxyl Number - 414.5 | |
| Douglas Fir Bark | 50 |
| Percent Hydroxyl - 13.5% | |
| Hydroxyl Number - 440.5 | |
| MDI (crude) | 160 |
| Catalyst (T-6*) | 2 |
| Surfactant (L-5420)** | 5 |
| Freon Blowing Agent | 20 |

*M&T - stannous salt of long fatty acid
**Union Carbide silicone

The bark was mixed with the polyisocyanate while the other components (catalyst, surfactant and blowing agent) were added while mixing continued. The resultant rigid polyurethane foam had the following properties:

| Density - lbs/cu. ft.$^3$ | 20 lbs/cu.ft.$^3$ |
|---|---|
| Compression Strength 10% Deflection psi ASTM - D 1621 | 442 psi |
| Flammability ASTM - D 1692-68 | |
| burning extent | 2 inches |
| burning time | 70 seconds |
| burning rate | 1.71 inches/minutes |

The burning rate (BR) in inches per minutes was calculated by the following equation:

$$BR = \frac{\text{distance burned (in.)} \times 60}{\text{Burning time (sec.)}}$$

Fire Characteristics
self-extinguishing
intumescent

EXAMPLE IV

A low density rigid polyurethane foam was produced from the following ingredients:

| Ingredient | Parts |
|---|---|
| Commerical Wattel Tannin | 100 |
| Surfactant (L-5420)* | 4 |
| Catalyst (T-6)** | 3 |
| H$_2$O Blowing Agent | 10 |
| MDI (crude) | 160 |

*Union Carbide silicone
**M&T - stannous salt of long chain fatty acid

Utilizing the technique of Example III, a product was obtained having the following physical properties:

| Density - lbs.cu.ft.$^3$ | 1.01 lbs/cu.ft.$^3$ |
|---|---|
| Compression Strength 10% Deflection psi ASTM - 1621 | 2 psi |

I claim:
1. In a process for the production of rigid compositions in which polyisocyanate is reacted with polyol to produce polyurethane, the improvement comprising employing bark or bark components as the polyol.
2. The process of claim 1, wherein the bark component comprises tannin.
3. The process of claim 1, wherein the polyol comprises particulate wood bark.
4. The process of claim 3, wherein the wood bark particles have a mesh size of between 50 and 325.
5. The process of claim 1, wherein the reaction occurs in the presence of sufficient blowing agent, catalyst and surfactant to yield a urethane foam having a density of between 1 and 40 pounds per cubic foot.
6. The process of claim 1, in which the polyol comprises at least 30% by weight of bark or its components.
7. The process of claim 1, in which the polyol comprises from 50 to 100% by weight of bark or its components.
8. The product produced by the process of claim 1.
9. The product produced by the process of claim 4.
10. The product produced by the process of claim 5.